United States Patent
Burkard et al.

(10) Patent No.: US 9,220,005 B2
(45) Date of Patent: Dec. 22, 2015

(54) DEVICE MANAGEMENT SERVICES VIA MOBILE DEVICES

(71) Applicant: Xerox Corporation, Norwalk, CT (US)

(72) Inventors: Michael C. Burkard, Canandaigua, NY (US); Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 13/682,169

(22) Filed: Nov. 20, 2012

(65) Prior Publication Data

US 2014/0141765 A1    May 22, 2014

(51) Int. Cl.
*H04W 24/00* (2009.01)
*H04W 8/00* (2009.01)
*H04W 84/20* (2009.01)
*H04W 4/02* (2009.01)

(52) U.S. Cl.
CPC .............. *H04W 8/005* (2013.01); *H04W 4/028* (2013.01); *H04W 84/20* (2013.01)

(58) Field of Classification Search
CPC ....... H04W 4/008; H04W 8/005; H04W 8/22; H04W 4/001; H04W 24/08; H04W 88/02; H04W 4/005; H04W 8/24; H04W 24/00; H04M 1/7253; H04M 1/72533; H04M 2250/02; H04M 11/007
USPC ................................ 455/418–420, 423, 41.2
See application file for complete search history.

(56) References Cited

U.S. PATENT DOCUMENTS

| | | | |
|---|---|---|---|
| 8,855,561 B2* | 10/2014 | Evanitsky et al. ...... | H04W 8/24 358/1.13 |
| 2002/0068559 A1* | 6/2002 | Sharma et al. ........ | H04W 24/00 455/423 |
| 2005/0076034 A1* | 4/2005 | Addonisio et al. .................. | G06F 17/30289 |
| 2008/0228956 A1* | 9/2008 | Lorenzo et al. .................. | 710/18 |
| 2009/0046739 A1* | 2/2009 | Ebling et al. ........... | G01D 21/00 370/465 |

* cited by examiner

*Primary Examiner* — Magdi Elhag (57) ABSTRACT

A method, non-transitory computer readable medium, and apparatus for monitoring a device asset of a customer via a mobile endpoint device are disclosed. For example, the method detects one or more devices of the customer via the mobile endpoint device, registers the one or more devices that are detected with an asset management system, wherein the asset management system is located remotely from the one or more devices, monitors the one or more devices and transmits one or more operation parameters associated with the one or more devices to the asset management system.

17 Claims, 4 Drawing Sheets

DEVICE MANAGEMENT SERVICES VIA MOBILE DEVICES

The present disclosure relates generally to monitoring and managing a customer's devices and, more particularly, to a method and an apparatus for monitoring and managing devices via mobile devices.

BACKGROUND

Current systems for monitoring and managing network assets for enterprises require software installed on a networked computer at the enterprise or customer site where the assets reside. The systems may be provided by a vendor to the customer. The computing equipment is usually managed by the customer's information technology organization because the vendor may not have personnel onsite and customers often do not allow remote, interactive access to computers on their network.

However, the computing equipment can be turned off or otherwise disconnected thus causing the vendor to lose the ability to deliver device asset management services. In addition, customers are cost conscious and often do not wish to pay for the dedicated computing and data storage resources required by the current systems for monitoring and managing their network assets.

SUMMARY

According to aspects illustrated herein, there are provided a method, a non-transitory computer readable medium, and an apparatus for monitoring a device asset of a customer via a mobile endpoint device. One disclosed feature of the embodiments is a method that detects one or more devices of the customer via the mobile endpoint device, registers the one or more devices that are detected with an asset management system, wherein the asset management system is located remotely from the one or more devices, monitors the one or more devices and transmits one or more operation parameters associated with the one or more devices to the asset management system.

Another disclosed feature of the embodiments is a non-transitory computer-readable medium having stored thereon a plurality of instructions, the plurality of instructions including instructions which, when executed by a processor, cause the processor to perform a method that detects one or more devices of the customer via the mobile endpoint device, registers the one or more devices that are detected with an asset management system, wherein the asset management system is located remotely from the one or more devices, monitors the one or more devices and transmits one or more operation parameters associated with the one or more devices to the asset management system.

Another disclosed feature of the embodiments is an apparatus comprising a processor that is configured to detect one or more devices of the customer via the mobile endpoint device, register the one or more devices that are detected with an asset management system, wherein the asset management system is located remotely from the one or more devices, monitor the one or more devices and transmit one or more operation parameters associated with the one or more devices to the asset management system.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for remotely monitoring a device asset of a customer via a mobile endpoint device. As discussed above, current systems for monitoring and managing network assets require dedicated computing resources at a customer site. In addition, the current systems require each device asset of the customer to have a particular type of connection to the dedicated computing resources.

However, mobile endpoint devices are becoming ubiquitous and many companies provide a mobile endpoint device to their employees. In addition, many endpoint devices have various communication capabilities including localized communication connections and wide area or external connections via a wireless network, e.g., a cellular network.

One embodiment of the present disclosure leverages the mobile endpoint devices carried by a customer's employees to automatically find and detect device assets of a customer and to remotely monitor and manage the device assets of the customer via the mobile endpoint devices. This eliminates the need to dedicate computing resources to remotely monitor and manage the customer's device assets, provides the ability to monitor and manage device assets that previously could not be remotely monitored and managed, and provides redundancy over multiple mobile endpoint devices carried by the customer's employees.

Figure 1:
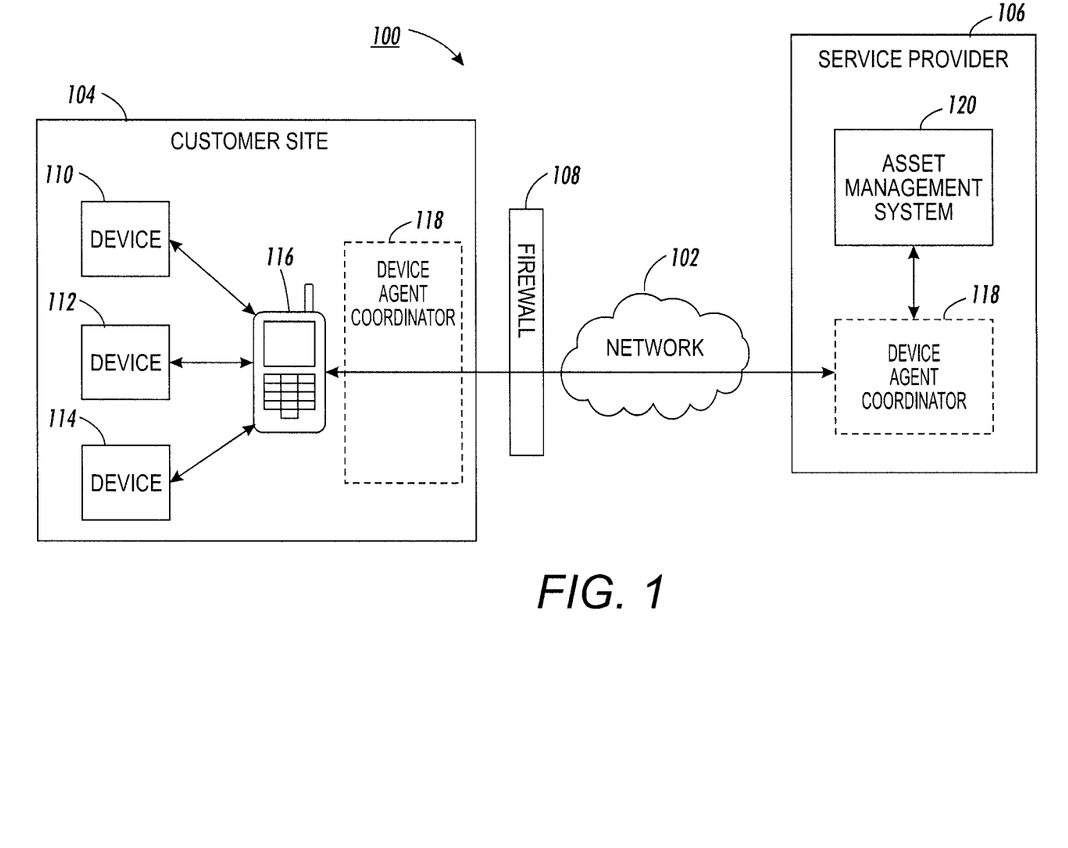
FIG. 1 illustrates one example of a communication network.

FIG. 1 illustrates one example of a communications network 100 of the present disclosure. In one embodiment, the communications network 100 includes a customer site 104, an external network 102 and a service provider site 106. In one embodiment, the customer site 104 may be an enterprise location of a business or corporation.

In one embodiment, the external network 102 may be any type of communications/data network, for example, the Internet, a cellular network (e.g., 3G, 4G, LTE), and the like. In one embodiment, the service provider site 106 may be a service provider that provides remote monitoring and management services for device assets at the customer site 104. For example, the services may include print management services.

In one embodiment, the customer site 104 may include one or more devices 110, 112 and 114, one or more mobile endpoint devices 116 and optionally a device agent coordinator 118. The one or more devices 110, 112 and 114 may be any type of device, e.g., a printer, a multi-function device, a computer, and the like. It should be noted that although three devices 110, 112 and 114 and a single mobile endpoint device 116 are illustrated in FIG. 1 that any number of devices or mobile endpoint devices may be deployed at the customer site 104. In one embodiment, a multi-function device (MFD) may include at least two different functions including, for example, digital image processing capability, electronic communication capability (e.g., email transmission, electronic file transmission, and the like), scanning capability, faxing capability, copying capability, printing capability, interfacing capability with a user via a graphical user interface with or without a touch screen, one or more input and output devices, and the like.

The one or more devices 110, 112 and 114 may have different connection capabilities. For example, the device 110 may have wireless networking capability and localized communications capability (e.g., Wi-Fi, Bluetooth®, personal area network (PAN), radio frequency (RF), near field communications (NFC), and the like), the device 112 may have only localized communications capability and the device 114 may have wired networking capability and localized communications capability.

In one embodiment, the mobile endpoint device 116 may be any type of mobile endpoint device, such as for example, a cell phone, a smart phone, a tablet computer, a netbook computer, a laptop computer, and the like. In one embodiment, the mobile endpoint device 116 has a plurality of different communications capabilities. The mobile endpoint device 116 may have various localized communication capabilities, such as for example, Wi-Fi, Bluetooth®, PAN, RF, NFC, and the like.

The mobile endpoint device 116 may also have wide area network or external communications capability. For example, the mobile endpoint device 116 may reach the Internet over a cellular communications network (e.g., 3G, 4G, LTE, and the like).

In one embodiment, the service provider site 106 may be located geographically remote from the customer site 104. For example, the service provider site 106 may be located in a different building, a different city, a different state or a different country than the customer site 104. The service provider site 106 may include an asset management system 120 or optionally a device agent coordinator 118. In other words, the device agent coordinator 118 may be located at either the customer site 104 or the service provider site 106. The device agent coordinator 118 may be embodied as hardware in a server or general purpose computer or as part of a server or general purpose computer functioning as the asset management system 120.

In one embodiment, the asset management system 120 may be executed by a general purpose computer (e.g., the general purpose computer described with reference to FIG. 5 below) that performs asset management operational and business functions. The asset management system 120 may be hosted as an Internet application or a cloud service. The management operational and business functions of the asset management system 120 may include, for example, asset inventory, tracking and locations, asset financials and depreciation, asset operational status, asset usage and billing, asset costs and optimization, asset incident management, asset supplies replenishment and the like.

The management operational and business functions may also include monitoring, tracking, configuring, messaging, responding and managing the device agent coordinator 118 and a device agent 202. The device agent 202 executing on the mobile endpoint device 116 is illustrated and discussed below with reference to FIG. 2.

In one embodiment, the mobile endpoint device 116 may be carried by an employee of the customer at the customer site 104. As the mobile endpoint device 116 travels around the customer site 104 (e.g., different floors, different buildings, different sections or rooms of a floor) throughout the day, the mobile endpoint device 116 may automatically detect various device assets of the customer. For example, the mobile endpoint device 116 may use the localized communications capability to communicate with the localized communications capabilities of the devices 110, 112 and 114.

In one embodiment, the mobile endpoint device 116 may collect initial registration information from the devices 110, 112 and 114 to determine if the device is registered with the asset management system 120. If the device is not already registered, the mobile endpoint device 116 may register the device with the asset management system 120 such that the device may be remotely monitored and managed.

In addition, the mobile endpoint device 116 may be equipped with global positioning system (GPS) capability. Since the communications is exchanged via a localized communications, the location of the mobile endpoint device 116 may be assumed to also be the location of the device. As a result, the mobile endpoint device 116 may also be used to provide the location information (e.g., via GPS) to the asset management system 120 during registration or to detect movement of the devices 110, 112 and 114.

As a result, one advantage of the present disclosure over currently deployed systems is that the localized communications capability of the mobile endpoint device 116 allows some devices to be remotely monitored and managed that previously could not be remotely monitored and managed. Using the above example, the device 112 may only have localized communications capability. As result, in currently deployed systems, the device 112 may not be able to register with the currently deployed monitoring systems because the device 112 has no way to communicate with the dedicated computing resources over the customer site's network. However, using the localized communications capability of the mobile endpoint device 116, the device 112 may now be identified, registered with the asset management system 120 and remotely monitored and managed.

In addition, using the mobile endpoint device 116 allows the devices 110, 112 and 114 to be automatically detected as the employees roam around the customer site 104. In contrast, the currently deployed systems sometimes required the dedicated computing system to manually search for devices that are found on the customer's network.

Another advantage to using the mobile endpoint device 116 is that the present disclosure provides redundancy and back up. For example, a plurality of different mobile endpoint devices 116 may be deployed to a plurality of different employees. As a result, if one mobile endpoint device 116 malfunctions, then another mobile endpoint device 116 may serve as a back up to continue the remote monitoring and management of the devices 110, 112 and 114.

In one embodiment, the mobile endpoint device 116 may monitor the devices 110, 112 and 114 that are registered to collect one or more operation parameters associated with the devices 110, 112 and 114. It should be noted that the term "devices" may be used interchangeably with "device assets" or "assets". In one embodiment, the operation parameters may include, for example, an asset inventory (e.g., ink levels, paper levels, and the like), a location tracking (e.g., detecting device movement or theft of a device that leaves the building), a usage monitoring for billing and optimization assessment, a device configuration, a software upgrade status, a device history (e.g., historical use history) or an error status.

The mobile endpoint device 116 may then transmit the operation parameters to the asset management system 120 over the network 102 via the device agent coordinator 118 that is located at either the customer site 104 or the service provider site 106. In one embodiment, a firewall 108 may be deployed for security.

In one embodiment, the communication between the mobile endpoint device 116 and the asset management system 120 may be a two-way communication. In other words, the communication is not only a push event (e.g., automatic periodic data transmission to the asset management system 120), but may also be a pull event (e.g., data transmission to the asset management system 120 in response to a request for information from the asset management system 120).

For example, the asset management system 120 may request a software upgrade status from the device 110 at any time. In response to the request, the mobile endpoint device 116 may collect the software upgrade status and forward the information to the asset management system 120.

In one embodiment, the asset management system 120 may send a control message to the mobile endpoint device 116 for the device 110 and control the device 110 in accordance with the control message. In other words, the asset management system may control the device 110 in that it can instruct the device 110 to initiate an action via the control message that the device 110 would otherwise not have initiated. For example, the asset management system 120 may determine that the device 110 has not be upgraded with the latest software and may send a control message to the device 110 via the mobile endpoint device 116 to upgrade to the latest version of software.

In one embodiment, the control message may include, for example, a reset signal, a power cycle signal, a configuration change signal, a diagnostic signal or a command signal. In one embodiment, the diagnostic signal may be to initiate an error check or recovery operation. In one embodiment, the command signal may be to take a particular action that the device is capable of performing, such as for example, performing a print function, performing a copy function, performing a scan function, performing a fax function, and the like.

Figure 2:
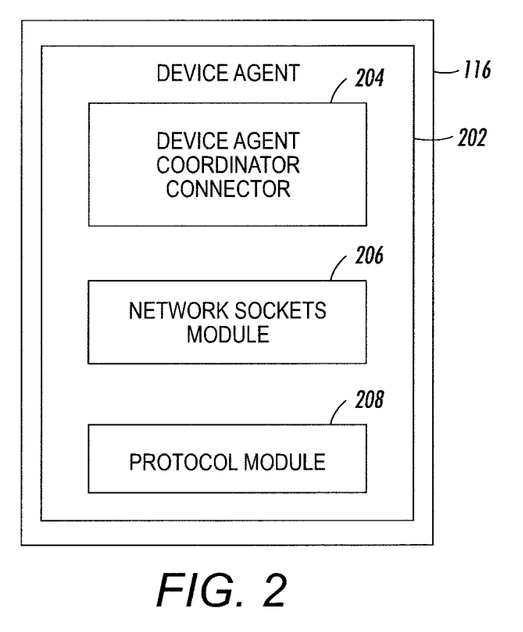
FIG. 2 illustrates an example of a device agent on a mobile endpoint device.

In one embodiment, the mobile endpoint device 116 may execute or load a device agent 202 illustrated in FIG. 2 to communicate with the asset management system 120 to remotely monitor and manage the devices 110, 112 and 114. In one embodiment, if there is a plurality of mobile endpoint devices 116 at the customer site 104, then each one of the plurality of mobile endpoint devices 116 would execute its own respective device agent 202.

In one embodiment, the device agent 202 may include various modules. The modules may include a device agent coordinator connector 204, a network sockets module 206 and, optionally, a protocol module 208. It should be noted that a protocol module 208 is required; however, where the protocol module 208 is located may be optional. In other words, the protocol module 208 may be located in the device agent 202 or in the device agent coordinator 118 depending on the processing capabilities of the mobile endpoint device 116 executing the device agent 202.

The device agent coordinator connector 204 may be responsible for receiving control messages from the device agent coordinator 118 and returning responses to the device agent coordinator 118. The control messages may be either protocol-specific or already encoded network message bytes. The responses may be either protocol-specific or network encoded response bytes. This may depend on whether the protocol module 208 is running in the device agent 202, running on the mobile endpoint device 116 or in the device agent coordinator 118.

The network sockets module 206 may be responsible for taking in network addresses and already encoded network message bytes and sending the message bytes to the recipient devices 110, 112 or 114. The network sockets module 206 may also be responsible for listening for network responses from the devices 110, 112 and 114. Responses may be sent to either the protocol module 208 if it is located on the device agent 202 at the mobile endpoint device 116 or to the device agent coordinator connector 204.

The protocol module 208 may implement a protocol for interacting with other devices. In one embodiment, there may be more than one protocol module 208 corresponding to each one of a plurality of protocols (e.g., simple network management protocol (SNMP), specific web services, and the like). Each protocol module 208 may take in a network address, a protocol-specific action to perform and any related data. The protocol module 208 then creates an encoded message ready to be sent on the network. The network address and encoded message may be passed to the network sockets module 206 for sending to the devices 110, 112 and 114. Responses received from the network sockets module 206 may be decoded and returned to the device agent coordinator connector 204.

Figure 3:
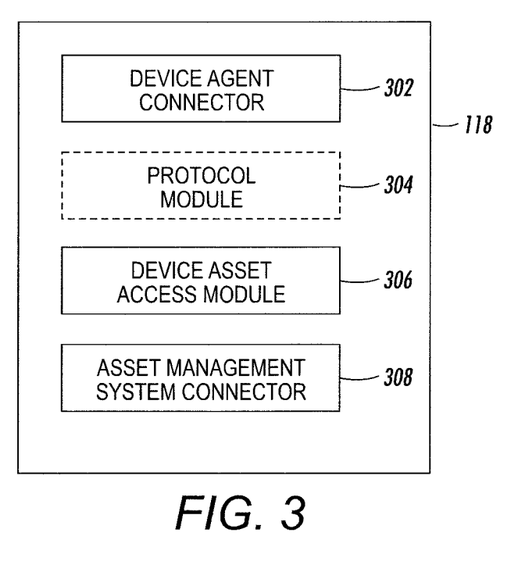
FIG. 3 illustrates an example of a device agent coordinator.

FIG. 3 illustrates one embodiment of a device agent coordinator 118. The device agent coordinator 118 may include a device agent connector 302, an optional protocol module 304, a device asset access module 306 and an asset management system connector 308.

In one embodiment, the device agent connector 302 may be responsible for sending control messages to the device agent 202 and receiving responses from the device agent 202. If the protocol module 304 is located at the device agent coordinator 118, the protocol module 304 may be similar to functionality as described above with respect to the protocol module 208.

In one embodiment, the device asset access module 306 may be responsible for analyzing management control messages from the asset management system connector 308 and determining which device asset access mechanisms to use to satisfy the request (e.g., which protocol modules 208 or 304 to invoke and how to invoke them). The device asset access module 306 may then be responsible for invoking the appropriate protocol modules 208 or 304. Responses received may be analyzed and an appropriate management control response may be sent to the asset management control connector 308 for return to the asset management system 120.

In one embodiment, the asset management system connector may be responsible for connecting with the asset management system 120 to receive management control messages and return responses to those messages.

Figure 4:
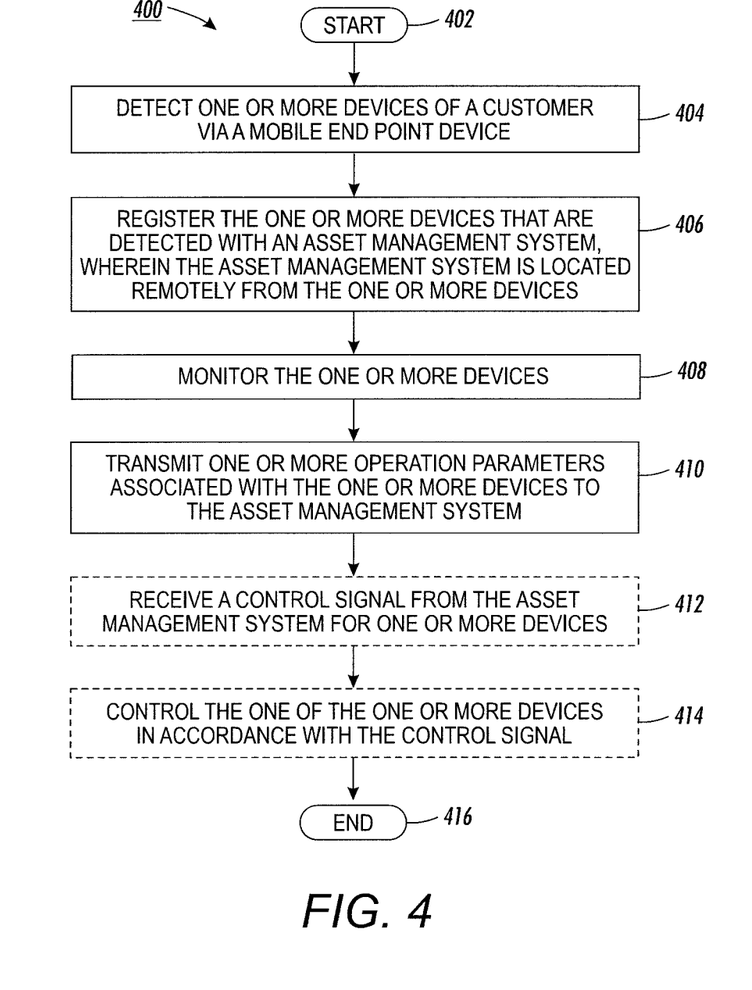
FIG. 4 illustrates an example flow chart of a method for remotely monitoring a device of a customer via a mobile endpoint device.

FIG. 4 illustrates a flowchart of a method 400 for remotely monitoring a device of a customer via a mobile endpoint device. In one embodiment, the method 400 may be performed by the mobile endpoint device 116 executing a device agent 202 or a general-purpose computer as illustrated in FIG. 5 and discussed below.

The method 400 begins at step 402. At step 404, the method 400 detects one or more devices of a customer via a mobile endpoint device. In one embodiment, the mobile endpoint device may be executing a device agent that communicates with a remotely located asset management system via a device agent coordinator that is located at either a customer site or a remotely located service provider site.

In one embodiment, the mobile endpoint device may be carried by an employee of the customer site. As the employee roams around the customer site, the mobile endpoint device may detect one or more devices of the customer using localized communications, such as for example, Bluetooth®, Wi-Fi, PAN, RF, NFC, and the like). For example, the one or more devices at the customer site may also be equipped with localized communications and be automatically detected by the mobile endpoint device via the localized communications.

In one embodiment, the device agent running on the mobile endpoint device may run a program to periodically send out a local communications signal to see if any device responds. If a response is received from a device, the mobile endpoint device may obtain additional information about the device that responded.

In one embodiment, the additional information may include whether or not the device is already registered with the asset management system. If the device is not already registered with the asset management system, the mobile endpoint device may forward the additional information to the asset management system to register the device. The additional information may further include a type of device, types of finishers on the device, configuration information of the device, a current inventory level (e.g., a level of paper, ink, staples, toner, etc.), and the like.

The additional information may also include the location information of the device. The mobile endpoint devices may include GPS information. Since the mobile endpoint devices communicate with the device using localized communications, the location of the mobile endpoint device may be assumed to also be the location of the device that is being registered.

At step 406, the method 400 registers the one or more devices that are detected with an asset management system, wherein the asset management system is located remotely from the one or more devices. The asset management system may be located remotely in another building, in another city, in another state or in another country. The asset management system may be a service provided by the service provider of the asset management system to provide value added services, such as for example, maintaining the devices at the customer site (e.g., correcting errors, keeping software up to date, etc.), managing costs associated with the devices at the customer site, providing timely replenishment of supplies (e.g., paper, toner, ink, etc.), and the like.

At step 408, the method 400 monitors the one or more devices. For example, the mobile endpoint device may monitor one or more operation parameters of each one of the one or more devices. In one embodiment, the one or more devices are dynamic. In other words, the status of each one of the devices is changing and various inventory levels of items within the devices (e.g., printers, copiers, fax machines and the like) are changing.

The operation parameters may include, for example, an asset inventory, a location tracking, a usage monitoring for billing and optimization assessment, a device configuration, a software upgrade status, a device history, an error status and the like. In one embodiment, the monitoring may be performed periodically, e.g., once an hour, once a day or once a week. In one embodiment, the monitoring may be performed automatically whenever the mobile endpoint device comes within the localized communication range of the one or more devices.

At step 410, the method 400 transmits one or more operation parameters associated with the one or more devices to the asset management system. For example, the device agent running on the mobile endpoint device may be configured to obtain the operation parameters from the devices and forward the operation parameters to the device agent coordinator. The device agent coordinator may then forward the information to the asset management system. In one embodiment, a firewall may be used for security. In one embodiment, the operation parameters may be transmitted over a cellular network (e.g., 3G, 4G, LTE, CDMA, and the like) used by the mobile endpoint device.

The method 400 may then perform optional steps 412 and 414. At optional step 412, the method 400 may receive a control signal from the asset management system for one of the one or more devices. In other words, the communication with the asset management system may be a two-way communication. That is, information may be requested by the asset management system and not simply pushed to the asset management system. In addition, the asset management system may send control signals to the devices as well as receiving information from the devices.

For example, the asset management system may analyze the operation parameters for one of the devices and determine that the device has been having an unusually high number of errors when compared to historical usage data. As a result, the asset management system may determine that the device should be restarted to help reduce the number of errors. The asset management system may send a control signal to the mobile endpoint device to reset the device. Subsequently, the asset management system may send a command signal for the device to perform various actions (e.g., a copying function, a scanning function, an emailing function, a diagnostic function, etc.) to ensure the device is operating properly after the reset is completed. In one embodiment, the control signals may include, for example, a reset signal, a power cycle signal, a configuration change signal, a diagnostic signal, a command signal, and the like.

At optional step 414, the method 400 may control the one of the one or more devices in accordance with the control signal. For example, the mobile endpoint device may receive the control signal from the asset management system and send a signal to the device to perform the action associated with the control signal. In one embodiment, the asset management system and/or the mobile endpoint device may be "controlling" the device by determining and initiating when various actions or functions should be performed by the device. The method 400 ends at step 416.

Thus, the present disclosure provides a more efficient and cost effective way to provide remote device management. The present disclosure leverages mobile endpoint devices that are issued to the customer's employees rather than incurring costs for dedicated computing resources. One advantage of the present disclosure is that devices can be registered with the asset management system that otherwise could not be registered by using the localized communications capability of the devices at the customer site and the mobile endpoint device. In addition, the present disclosure provides redundancy and back-up as each one of a plurality of mobile endpoint devices executing a copy of the device agent may be used to perform the remote device management and monitoring. In currently deployed systems, the dedicated computing resources may be accidentally turned off or disconnected, thereby, losing the ability to remotely manage and monitor the devices.

It should be noted that although not explicitly specified, one or more steps, functions or operations of the method 400 described above may include a storing, displaying and/or outputting step as required for a particular application. In other words, any data, records, fields, and/or intermediate results discussed in the method can be stored, displayed, and/or outputted to another device as required for a particular application. Furthermore, steps, blocks or operations in FIG. 4 that recite a determining operation, or involve a decision, do not necessarily require that both branches of the determining operation be practiced. In other words, one of the branches of the determining operation can be deemed as an optional step.

Figure 5:
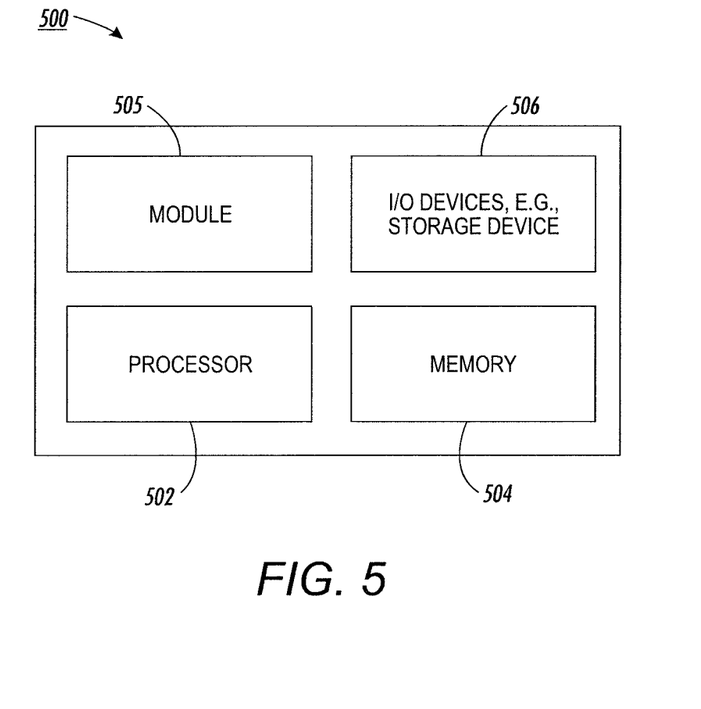
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for remotely monitoring a device of a customer via a mobile endpoint device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps or operations of the above disclosed method. In one embodiment, the present module or process 505 for remotely monitoring a device of a customer via a mobile endpoint device can be loaded into memory 504 and executed by processor 502 to implement the functions as discussed above. As such, the present method 505 for remotely monitoring a device of a customer via a mobile endpoint device (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for monitoring a plurality of different devices of a customer via a mobile endpoint device, comprising:
   detecting, by a processor of the mobile endpoint device, the plurality of different devices of the customer as the mobile endpoint device is migrating around a customer site, wherein each one of the plurality of different devices has a different communication capability and the mobile endpoint device has each communication capability of the plurality of different devices and a wide area network communication capability;
   registering, by the processor of the mobile endpoint device, the plurality of different devices that are detected with an asset management system, wherein the asset management system is located remotely from the one or more plurality of different devices;
   monitoring, by the processor of the mobile endpoint device, the plurality of different devices;
   transmitting, by the processor of the mobile endpoint device, one or more operation parameters associated with the plurality of different devices to the asset management system;
   receiving, by the processor of the mobile endpoint device, a control message from the asset management system for one of the plurality of different devices; and
   controlling the one of the plurality of different devices in accordance with the control message.

2. The method of claim 1, wherein the mobile endpoint device comprises a device agent executed on the mobile endpoint device.

3. The method of claim 1, wherein a device agent coordinator forwards the one or more operation parameters transmitted from the mobile endpoint device to the asset management system.

4. The method of claim 1, wherein one of the plurality of different devices has a localized communications capability.

5. The method of claim 1, wherein the transmitting is performed in response to a request from the asset management system.

6. The method of claim 1, wherein the registering comprises providing a location information of the plurality of different devices based upon a location information of the mobile endpoint device.

7. The method of claim 1, wherein the one or more operation parameters comprise at least one of: an asset inventory, a location tracking, a usage monitoring for billing and optimization assessment, a device configuration, a software upgrade status, a device history or an error status.

8. The method of claim 1, wherein the control message comprises at least one of: a reset signal, a power cycle signal, a configuration change signal, a diagnostic signal or a command signal.

9. A non-transitory computer-readable medium storing a plurality of instructions, the plurality of instructions including instructions, which when executed by a processor of a mobile endpoint device, cause the processor to perform operations for remotely monitoring a plurality of different devices of a customer via the mobile endpoint device, the operations comprising:
   detecting the plurality of different devices of the customer as the mobile endpoint device is migrating around a customer site, wherein each one of the plurality of different devices has a different communication capability and the mobile endpoint device has each communication capability of the plurality of different devices and a wide area network communication capability;
   registering the plurality of different devices that are detected with an asset management system, wherein the asset management system is located remotely from the one or more plurality of different devices;
   monitoring the plurality of different devices;
   transmitting one or more operation parameters associated with the plurality of different devices to the asset management system;
   receiving a control message from the asset management system for one of the plurality of different devices; and
   controlling the one of the plurality of different devices in accordance with the control message.

10. The non-transitory computer-readable medium of claim 9, wherein the mobile endpoint device comprises a device agent executed on the mobile endpoint device.

11. The non-transitory computer-readable medium of claim 9, wherein a device agent coordinator forwards the one or more operation parameters transmitted from the mobile endpoint device to the asset management system.

12. The non-transitory computer-readable medium of claim 9, wherein one of the plurality of different devices has a localized communications capability.

13. The non-transitory computer-readable medium of claim 9, wherein the transmitting is performed in response to a request from the asset management system.

14. The non-transitory computer-readable medium of claim 9, wherein the registering comprises providing a location information of the plurality of different devices based upon a location information of the mobile endpoint device.

15. The non-transitory computer-readable medium of claim 9, wherein the one or more operation parameters comprise at least one of: an asset inventory, a location tracking, a usage monitoring for billing and optimization assessment, a device configuration, a software upgrade status, a device history or an error status.

16. The non-transitory computer-readable medium of claim 9, wherein the control message comprises at least one of: a reset signal, a power cycle signal, a configuration change signal, a diagnostic signal or a command signal.

17. A method for monitoring a plurality of different multi-function devices of a customer via a mobile endpoint device, comprising:

detecting, by a processor, the plurality of different multi-function devices of the customer at different locations at a customer site as the mobile endpoint device is migrating around the customer site, wherein the plurality of different multi-function devices are not configured to communicate with a networked computer for managing the plurality of different multi-function devices, wherein the plurality of different multi-function devices each has a different communication capability, wherein one of the plurality of different multi-function devices has a localized communications capability, wherein the mobile endpoint device has each communication capability of the plurality of different multi-function devices and a wide area network communication capability;

registering, by the processor, the plurality of different multi-function devices that are detected with an asset management system, wherein the asset management system is located remotely from the plurality of different multi-function devices;

monitoring, by the processor, the plurality of different multi-function devices;

transmitting, by the processor, in response to a request from the asset management system, one or more operation parameters associated with the plurality of different multi-function devices to the asset management system via a device agent coordinator;

receiving, by the processor, a control message from the asset management system for one of the plurality of different multi-function devices; and controlling, by the processor, the one of the plurality of different multi-function devices in accordance with the control message.

* * * * *